(12) United States Patent
Hirako

(10) Patent No.: US 9,049,328 B2
(45) Date of Patent: Jun. 2, 2015

(54) AUTOMATIC DOCUMENT FEEDING APPARATUS, IMAGE SCANNING APPARATUS, AND IMAGE FORMING SYSTEM

(71) Applicant: Hiroshi Hirako, Aichi (JP)

(72) Inventor: Hiroshi Hirako, Aichi (JP)

(73) Assignee: Ricoh Company, Limited, Tokyo (JP)

( * ) Notice: Subject to any disclaimer, the term of this patent is extended or adjusted under 35 U.S.C. 154(b) by 147 days.

(21) Appl. No.: 13/787,895

(22) Filed: Mar. 7, 2013

(65) Prior Publication Data

US 2013/0236227 A1 Sep. 12, 2013

(30) Foreign Application Priority Data

Mar. 7, 2012 (JP) ................. 2012-050421

(51) Int. Cl.
*B65H 1/00* (2006.01)
*G03G 15/00* (2006.01)
*H04N 1/00* (2006.01)
*B65H 7/02* (2006.01)
*H04N 1/12* (2006.01)

(52) U.S. Cl.
CPC ......... *H04N 1/0057* (2013.01); *H04N 1/00628* (2013.01); *H04N 1/00689* (2013.01); *H04N 1/00692* (2013.01); *H04N 1/00694* (2013.01); *H04N 1/00702* (2013.01); *H04N 1/00713* (2013.01); *H04N 1/12* (2013.01); *B65H 7/02* (2013.01); *B65H 2511/51* (2013.01); *B65H 2511/514* (2013.01); *B65H 2553/00* (2013.01); *B65H 2701/1311* (2013.01); *B65H 2701/1313* (2013.01)

(58) Field of Classification Search
CPC ........... G03G 15/00; G03G 21/00; B65H 1/00

USPC .................................. 399/367–372
See application file for complete search history.

(56) References Cited

U.S. PATENT DOCUMENTS

| | | | | |
|---|---|---|---|---|
| 6,151,478 | A * | 11/2000 | Katsuta et al. | 399/372 |
| 7,460,825 | B2 * | 12/2008 | Sawanaka et al. | 399/371 |
| 8,444,135 | B2 * | 5/2013 | Morita et al. | 271/3.17 |
| 2007/0264063 | A1 * | 11/2007 | Sano et al. | 399/367 |
| 2009/0039594 | A1 * | 2/2009 | Sato et al. | 271/258.01 |
| 2009/0040572 | A1 * | 2/2009 | Shimmachi et al. | 358/497 |
| 2010/0225045 | A1 * | 9/2010 | Kimura et al. | 271/4.08 |
| 2011/0058881 | A1 * | 3/2011 | Mitamura | 400/582 |
| 2011/0128596 | A1 * | 6/2011 | Tonooka et al. | 358/498 |
| 2012/0119432 | A1 * | 5/2012 | Kambayashi et al. | 271/10.02 |

* cited by examiner

FOREIGN PATENT DOCUMENTS

| | | | | |
|---|---|---|---|---|
| JP | 2005244798 | A * | 9/2005 | |
| JP | 2006-052082 | | 2/2006 | |
| JP | 2006052082 | A * | 2/2006 | B65H 1/00 |

*Primary Examiner* — Nguyen Ha
(74) *Attorney, Agent, or Firm* — Harness, Dickey & Pierce, P.L.C.

(57) ABSTRACT

A CPU checks a detecting state of a document set sensor at a point when the trailing end of a document sheet is assumed to pass through a separating position at which the document sheet is separated by a separation roller, based on a document length determined based on a detecting output from an abutting sensor. If the document set sensor does not detect a document sheet, the CPU determines that the next document sheet is not present. If the document set sensor detects a document sheet, the CPU checks a detecting state of the document presence detecting sensor. If the document presence detecting sensor detects a document sheet, the CPU determines that the next document sheet is present.

13 Claims, 6 Drawing Sheets

AUTOMATIC DOCUMENT FEEDING APPARATUS, IMAGE SCANNING APPARATUS, AND IMAGE FORMING SYSTEM

CROSS-REFERENCE TO RELATED APPLICATIONS

The present application claims priority to and incorporates by reference the entire contents of Japanese Patent Application No. 2012-050421 filed in Japan on Mar. 7, 2012.

BACKGROUND OF THE INVENTION

1. Field of the Invention

The present invention relates to an automatic document feeding apparatus, an image scanning apparatus, and an image forming system. More particularly, the present invention relates to an automatic document feeding apparatus including a function for determining the presence of a document, an image scanning apparatus including such an automatic document feeding apparatus, and an image forming system including the image scanning apparatus and an image forming apparatus.

2. Description of the Related Art

As an example of such a technology, the invention disclosed in Japanese Patent Application Laid-open No. 2006-052082 is known. A document scanning apparatus according to this invention includes a document table on which a plurality of document sheets are placed, a separating unit that separates a document sheet one by one from the document sheets placed on the document table, a paper feeding unit that feeds the document sheet separated by the separating unit to a predetermined position, a last document detecting sensor that detects the last document sheet on the document table, and a document set detecting sensor that detects that a document sheet is placed on the document table. In such a document feeding apparatus, the document sheet is fed while receiving signals from the document set sensor and the last document detecting sensor. When the last document detecting sensor detects that no document sheet is placed on the document table, a feed controller determines whether the document sheet is the last document sheet based on an output from the document set sensor, and outputs a result of the determination.

The invention disclosed in Japanese Patent Application Laid-open No. 2006-052082 is intended to prevent an error in determination of whether a document sheet is the last document sheet without increasing the size of the machine. However, in order to prevent an error in determination of whether a document sheet is the last document sheet, the feed controller needs to perform determination of whether the next document sheet is present four times at most. The number of processes thus increases, resulting in reduced efficiency. Furthermore, because the feed controller determines whether the document sheet is the last document sheet based on an output from the document set sensor when the last document detecting sensor detects that no document sheet is on the document table, the document might not be detected correctly depending on how the document sheet is curled or due to document slipping. Furthermore, when the size of the document sheet is small, the feed controller cannot come to a conclusion as to whether the next document sheet is present based on the outputs from the sensors on the document tray, and can only arrive at the conclusion based on the output from the document set sensor. Therefore, productivity is reduced significantly.

Therefore, there is a need for an automatic document feeding apparatus, an image scanning apparatus, and an image forming system capable of efficiently determining the presence of the next document sheet even when the size of the document sheet is small, without being affected by how the document sheet is curled, document slipping, or the like.

SUMMARY OF THE INVENTION

According to an embodiment, there is provided an automatic document feeding apparatus that includes a document setting unit on which a plurality of document sheets to be scanned are placed; and a separating feeding unit that separates and feeds a document sheet one by one from the document sheets placed on the document setting unit. The automatic document feeding apparatus conveys the document sheet thus separated to a scanning unit and causing the document sheet to be scanned by the scanning unit while conveying the document sheet. The automatic document feeding apparatus further includes a document presence detecting unit that detects whether a document sheet is present on the document setting unit; a document set detecting unit that detects whether a leading end of a document sheet is present on a set position on the document setting unit; a conveying path document detecting unit that detects a document sheet being conveyed to the scanning unit on a conveying path; and a determining unit that determines presence of a next document sheet based on detecting states of the detecting units. The determining unit checks the detecting state of the document set detecting unit at a point when a trailing end of the document sheet is assumed to pass through a separating position at which the document sheet is separated by the separating feeding unit, using a document length determined based on a detecting output of the conveying path document detecting unit. When the document set detecting unit does not detect a document sheet, the determining unit determines that the next document sheet is not present, but when the document set detecting unit detects a document sheet, the determining unit further checks the detecting state of the document presence detecting unit. When the document presence detecting unit detects that a document sheet is present, the determining unit determines that the next document sheet is present, but when the document presence detecting unit detects that a document sheet is not present, the determining unit waits until the trailing end of the document sheet passes through the conveying path document detecting unit, and, at that point, when the document set detecting unit detects a document sheet, the determining unit determines that the next document sheet is present, but when the document set detecting unit does not detect a document sheet, the determining unit determines that the next document sheet is not present.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

In the present invention, the presence of the next document sheet is determined at the timing when the trailing end reaches a specific position based on a determined document length or a provisional document length. An embodiment of the present invention will now be explained with reference to the appended drawings.

Figure 1:
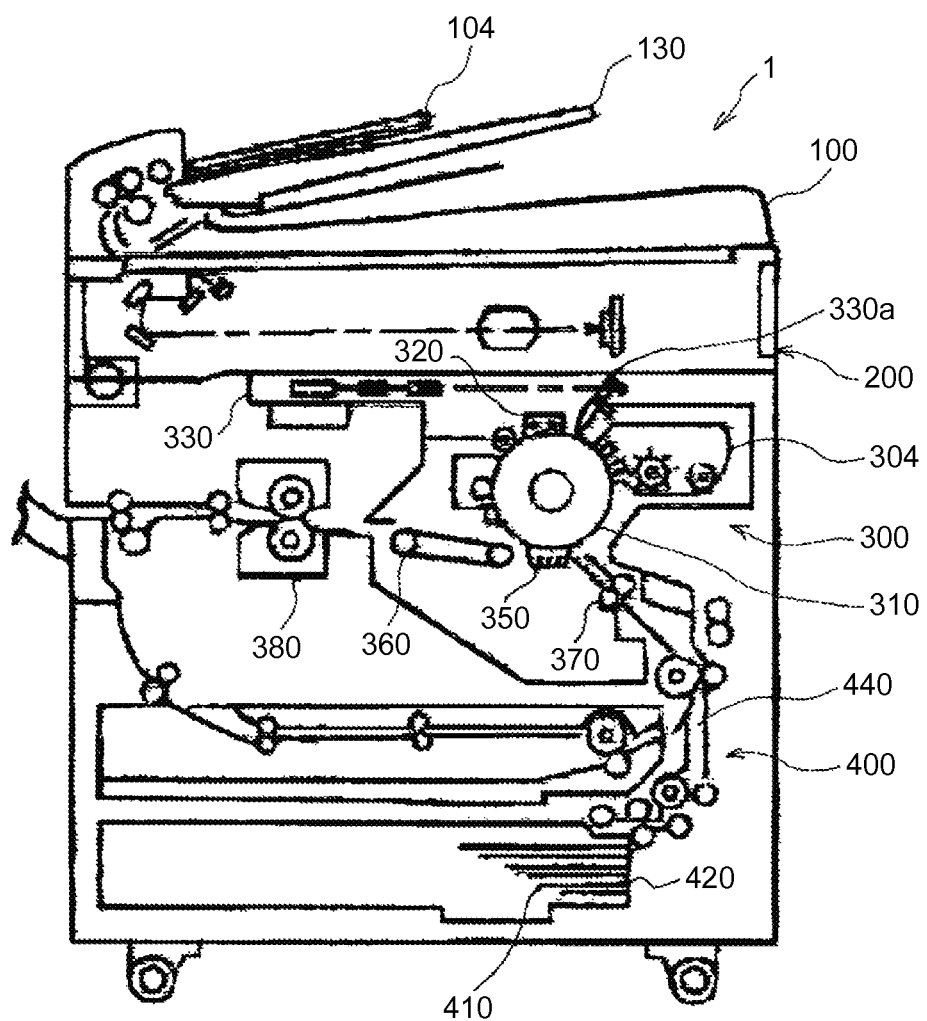
FIG. 1 is a schematic illustrating a structure of a copying machine serving as an image forming system according to an embodiment.

FIG. 1 is a schematic illustrating a structure of a copying machine 1 serving as an image forming system according to an embodiment of the present invention. The copying machine 1 basically includes an automatic document feeding apparatus 100, an image scanning apparatus 200, and an image forming apparatus 300. In the embodiment, the image forming apparatus 300 includes an electrophotographic image formation engine. The image formation engine includes a photosensitive element 310 and peripheral imaging units. Provided as the peripheral imaging units are various imaging units such as a charging unit 320, an exposing unit 330a provided to a writing unit 330, a developing unit 340, a transfer unit 350, a cleaning unit 360, arranged along the outer circumference of the photosensitive element 310, an operating unit not illustrated, and a conveyance control unit.

The photosensitive element 310 includes a photosensitive drum. The charging unit 320 charges the surface of the photosensitive drum to a predetermined potential. The writing unit 330 performs writing with an optically modulated laser beam or the like to the exposing unit 330a to form an electrostatic latent image on the surface of the photosensitive element 310. The developing unit 340 attaches toner to visualize the electrostatic latent image thus formed. The transfer unit 350 transfers the toner image thus visualized onto a recording sheet 410 fed by the paper feeding unit 400. The cleaning unit 360 cleans the surface of the photosensitive element 310 after the transfer, and the surface of the photosensitive element 310 is carried to the charging unit 320. The recording sheet on which the image is transferred is fixed in a fixing unit 380, and sent to a subsequent process.

The paper feeding unit 400 includes a paper feeding cassette 420 in which the recording sheets 410 are stacked. The recording sheet 410 is fed from the paper feeding cassette 420 by a paper feeding roller 430 provided near the exit of the paper feeding cassette 420, passed through a conveying path 440, and conveyed into the transfer unit 350. Registration rollers 370 are provided in the conveying path 440 before the transfer unit 350. The registration rollers 370 feeds the recording sheet 410 at timing synchronized with the image on the photosensitive element 310.

When a document sheet is placed on the automatic document feeding apparatus 100, the automatic document feeding apparatus 100 detects that the document sheet has been set, and detects the size of the document sheet based on information from sensors arranged on a document tray 130. The copying machine 1 can form image while scanning the image of the document sheet without any special image memory, because the automatic document feeding apparatus 100 is a sheet-through feeding apparatus that allows a transfer sheet to be selected by detecting the size of the document sheet before the image formation is started.

When a copying operation of the copying machine 1 is started, the automatic document feeding apparatus 100 separates and feeds a document sheet 104 one sheet at a time, and conveys the document sheet 104 to a scanning unit (exposure glass 111) provided on the image scanning apparatus 200. In the scanning unit, an optical system included in the image scanning apparatus 200 reads the image of the document sheet 104, and converts the image into an electrical signal. The paper feeding unit 400 provided to the main unit of the copying machine 1 feeds a recording sheet 410 from the paper feeding cassette 420 toward the registration rollers 370. An imaging operation is then performed. Next document sheet presence information is notified from the automatic document feeding apparatus 100, and a recording sheet 410 is pre-fed into the registration rollers 370 from the paper feeding cassette 420 in advance based on the next document sheet presence information.

Figure 2:
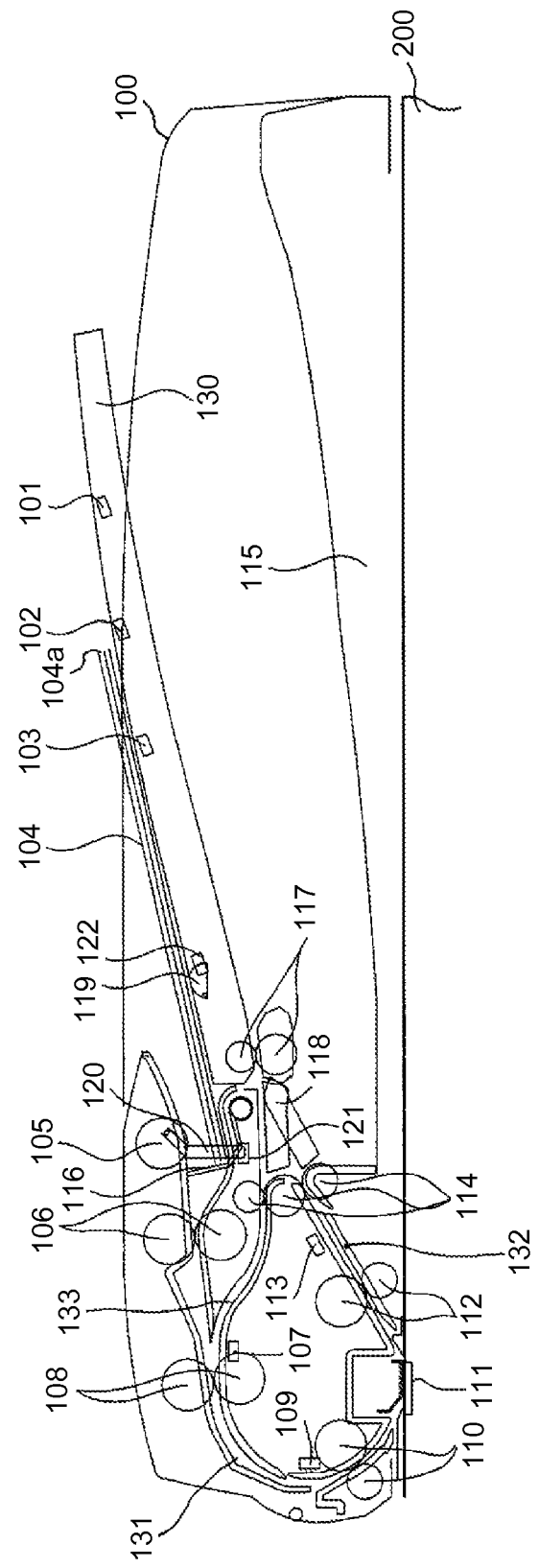
FIG. 2 is a schematic illustrating a structure of an automatic document feeding apparatus illustrated in FIG. 1 more in detail.

FIG. 2 is a schematic illustrating the structure of the automatic document feeding apparatus 100 more in detail. The automatic document feeding apparatus 100 includes the document tray 130, a paper feeding conveying path 131, a discharge conveying path 132, a reverse conveying path 133, and a document discharge tray 115. On the document tray 130, first to third document length sensors 101, 102, 103, a trailing end detecting sensor 122, a document set sensor 121, a trailing end detecting feeler 119, and a document set feeler 120 are provided. A pick-up roller 105 is provided above the document set feeler in the paper feeding conveying path 131.

Separation rollers 106, pull-out rollers 108, and registration rollers 110 are provided in this order on a downstream side of the pick-up roller 105 in the paper feeding conveying path 131. First discharging rollers 112, a discharging sensor 113, and second discharging rollers 114 are arranged on a downstream side of the exposure glass 111 in the discharge conveying path 132. A reverse bifurcating claw 118 and reverse rollers 117 are provided subsequent to the second discharging rollers 114 in the reverse conveying path 133. The second discharging rollers 114 also function as conveying rollers provided to a conveying path leading from the reverse bifurcating claw 118 to the reverse conveying path 133.

The document tray 130 is a tray on which the document sheets 104 to be fed are placed. The pick-up roller 105, the separation rollers 106, the reverse rollers 117, and the pull-out rollers 108 are connected to a paper feeding motor not illustrated. When the paper feeding motor is reversely rotated, the pick-up roller 105, the separation rollers 106, and the reverse rollers 117 are caused to operate. The pull-out rollers 108 are provided with a one-way clutch, and are not rotated when the paper feeding motor is reversely rotated. When the paper feeding motor is forwardly rotated, the pick-up roller 105, the separation rollers 106, the reverse rollers 117, and the pull-out rollers 108 are caused to operate. A clutch is provided to the pick-up roller 105. When the paper feeding motor is forwardly rotated, the clutch is disengaged, so that the pick-up roller 105 is not rotated. A solenoid is connected to the pick-up roller 105. When the solenoid is operated, the pick-up roller 105 is lowered, and the pick-up roller 105 is brought into contact with (placed on top of) the document sheet 104 when the document sheet 104 is placed on the document tray 130.

The registration rollers 110 and the discharging rollers 112, 114 are connected to a conveying motor not illustrated. When the conveying motor is forwardly rotated, the registration rollers 110 and the discharging rollers 112, 114 are caused to operate. When the conveying motor is reversely rotated, a document set claw 116 is lifted. When the solenoid connected to the document set claw 116 is operated, the document set claw 116 is lowered. The reverse bifurcating claw 118 is connected to a solenoid, and the paths for conveying the document sheet 104 are switched by operating the solenoid.

The first to the third document length sensors 101, 102, 103 are provided as sensors for detecting the length of a document sheet, and detect the length and the condition of the document sheet. An abutting sensor 107, a registration sensor 109, and the discharging sensor 113 are provided in the paper feeding conveying path 131 as feed sensors. The document sheet 104 is scanned at the position of the exposure glass 111.

When a feeding operation of a document sheet is to be performed, in order to feed the document sheet 104 placed on the document tray 130 into the separation rollers 106, the document set claw 116 is lowered if the document set claw 116 is not lowered so that the document sheet 104 is allowed to be fed into the paper feeding conveying path 131. The pick-up roller 105 is also lowered onto the document sheet 104. The pick-up roller 105 is then rotated at that position to feed the document sheet 104 into the separation rollers 106.

The upper roller of the separation rollers 106 is rotated in a conveying direction of the document sheet 104. The lower roller of the separation rollers 106 is rotated in a reverse direction of the conveying direction of the document sheet 104 so as to feed only the top sheet of the document sheet 104 into the paper feeding conveying path 131 while pushing back the remaining sheets of the document sheet 104. In this manner, a plurality of document sheets 104 are prevented from being fed into the separation rollers 106. The document sheet 104 separated into a sheet is passed along the abutting sensor 107, and reaches the pull-out rollers 108.

At this point, the pull-out rollers 108 are not rotating, and the leading end of the document sheet 104 gets inside of the nip of the pull-out rollers 108 by a certain distance. The pick-up roller 105 and the separation rollers 106 are stopped at the point where the document sheet 104 gets inside of the nip by the certain distance. This operation allows the leading end of the document sheet 104 to be aligned perpendicularly to the conveying direction so that skew of the leading end of the document sheet 104 can be corrected.

The paper feeding motor is then forwardly rotated, to cause the pull-out rollers 108 to rotate in the conveying direction. The conveying motor is also forwardly rotated to cause the registration rollers 110 and the discharging rollers 112, 114 to rotate in the conveying direction. Through these operations, the document sheet 104 is conveyed, passed across the registration sensor 109, and passed through the registration rollers 110. After being conveyed by a certain distance, the paper feeding motor and the conveying motor are stopped right before the document sheet 104 reaches the exposure glass 111, and the document sheet 104 is stopped.

When an instruction for an operation for reading the document sheet 104 is received from the image forming apparatus 300, the paper feeding motor is forwardly rotated to cause the pull-out rollers 108 to rotate in the conveying direction, and the conveying motor is forwardly rotated to cause the registration rollers 110 and the discharging rollers 112, 114 to rotate in the conveying direction so that the document sheet 104 is conveyed further. When the leading end of the document sheet 104 reaches the exposure glass 111 that is the reading position, the automatic document feeding apparatus 100 transmits a reading start signal to the image scanning apparatus 200 to cause the image scanning apparatus 200 to start reading the document sheet 104.

When the trailing end 104a of the document sheet 104 is passed through the exposure glass 111 being the reading position, the automatic document feeding apparatus 100 transmits a reading completion signal to the image scanning apparatus 200 to cause the image scanning apparatus 200 to end the reading operation. When only the front side of the document sheet 104 is to be read, the reverse bifurcating claw 118 is not operated (kept at the upper position in FIG. 2). Because the reverse bifurcating claw 118 is kept at this position, the document sheet 104 is discharged onto the document discharge tray 115. Once the document sheet 104 is discharged, both of the motors are stopped, and the operations of conveying the document sheet 104 are stopped.

When both of the front side and the rear side of the document sheet 104 are to be read, the reverse bifurcating claw 118 is lowered (to the lower position in FIG. 2), and the document sheet 104 is carried into the reverse rollers 117. Once the trailing end 104a of the document sheet 104 passes through the reverse bifurcating claw 118, the paper feeding motor and the conveying motor are stopped so that the document sheet 104 is stopped. The reverse bifurcating claw 118 is then lifted to switch the trailing end 104a of the document sheet 104 to the direction of the reverse conveying path 133. The paper feeding motor is then reversely rotated, and the conveying motor is forwardly rotated, to convey the document sheet 104 toward the direction of the pull-out rollers 108. In this manner, the document sheet 104 thus reversed is sent toward the direction of the exposure glass 111.

After the document sheet 104 reaches the pull-out rollers 108, the same operations as those performed for the front side are repeated. The document sheet 104 is then reversed again. Once the document sheet 104 reaches the pull-out rollers 108, the paper feeding motor and the conveying motor are operated, and the document sheet 104 is discharged onto the document discharge tray 115. Once the document sheet 104 is discharged, both of the motors are stopped. In both cases in which only the front side is read and in which both of the front side and the rear side are read, if any document sheet 104 is still remaining on the document tray 130, the document sheet 104 is automatically fed (pre-fed) before the document sheet 104 is discharged onto the document discharge tray 115.

Figure 3:
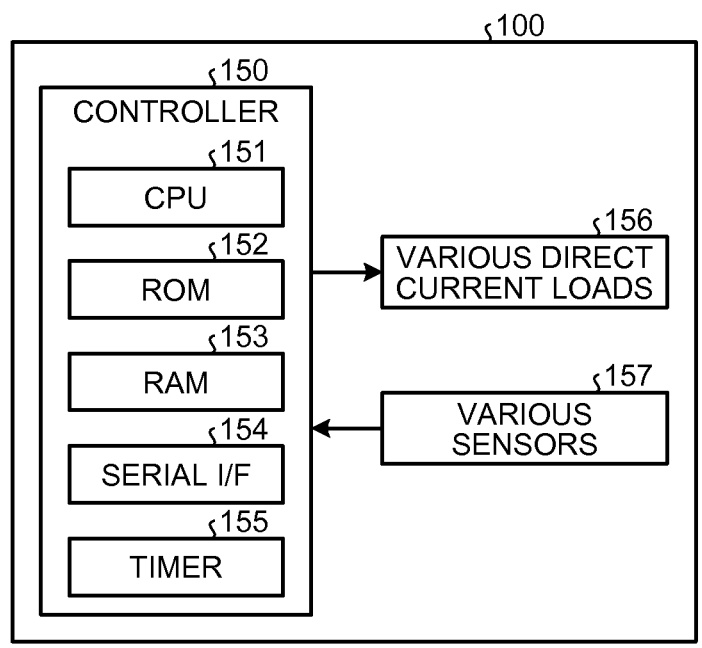
FIG. 3 is a block diagram illustrating a configuration of control mechanism of the automatic document feeding apparatus.

FIG. 3 is a block diagram illustrating a configuration of a control mechanism of the automatic document feeding apparatus 100. Control of the automatic document feeding apparatus 100 is executed by a controller 150 including a central processing unit (CPU) 151, a read-only memory (ROM) 152, a random access memory (RAM) 153, a serial interface (I/F) 154, a timer 155, and the like. A program code for executing the control is stored in the ROM 152. The CPU 151 loads the program code onto the RAM 153, and stores data required in the control in the RAM 153. The CPU 151 executes control specified in the program code while using the RAM 153 as a working area, receives detection signals from various sensors 157, to control various direct current loads 156 of the paper feeding motor, the conveying motor, and the like. The image scanning apparatus 200 and the image forming apparatus 300 transmit and receive commands that are required in controlling feeding of a document sheet via the serial I/F 154.

There are three operation modes that are available when a document sheet is to be fed by the automatic document feeding apparatus 100. These modes include: a normal mode for feeding the same regular-sized document sheets; a mixed-size mode for feeding document sheets having the same width but are different in length; and a long document mode for scanning a document sheet after the document length is specified in advance. In the normal mode, the first to the third document length sensors 101, 102, 103 provided on the document tray are used to estimate a provisional document length before a document sheet is fed. The document sheet 104 is then conveyed, and a determined document length is determined based on a detecting state of the abutting sensor 107 and a detecting state of the registration sensor 109.

In the normal mode, the determined document length is used in the control performed for the next sheet and subsequent document sheets. By contrast, in the mixed-size mode, the determined document length is not used for the next and subsequent document sheets, and the control is continued using the provisional document length of the document sheet until the determined document length of the document sheet is determined. In the long document mode, the control is performed based on a specified document length.

Figure 4:
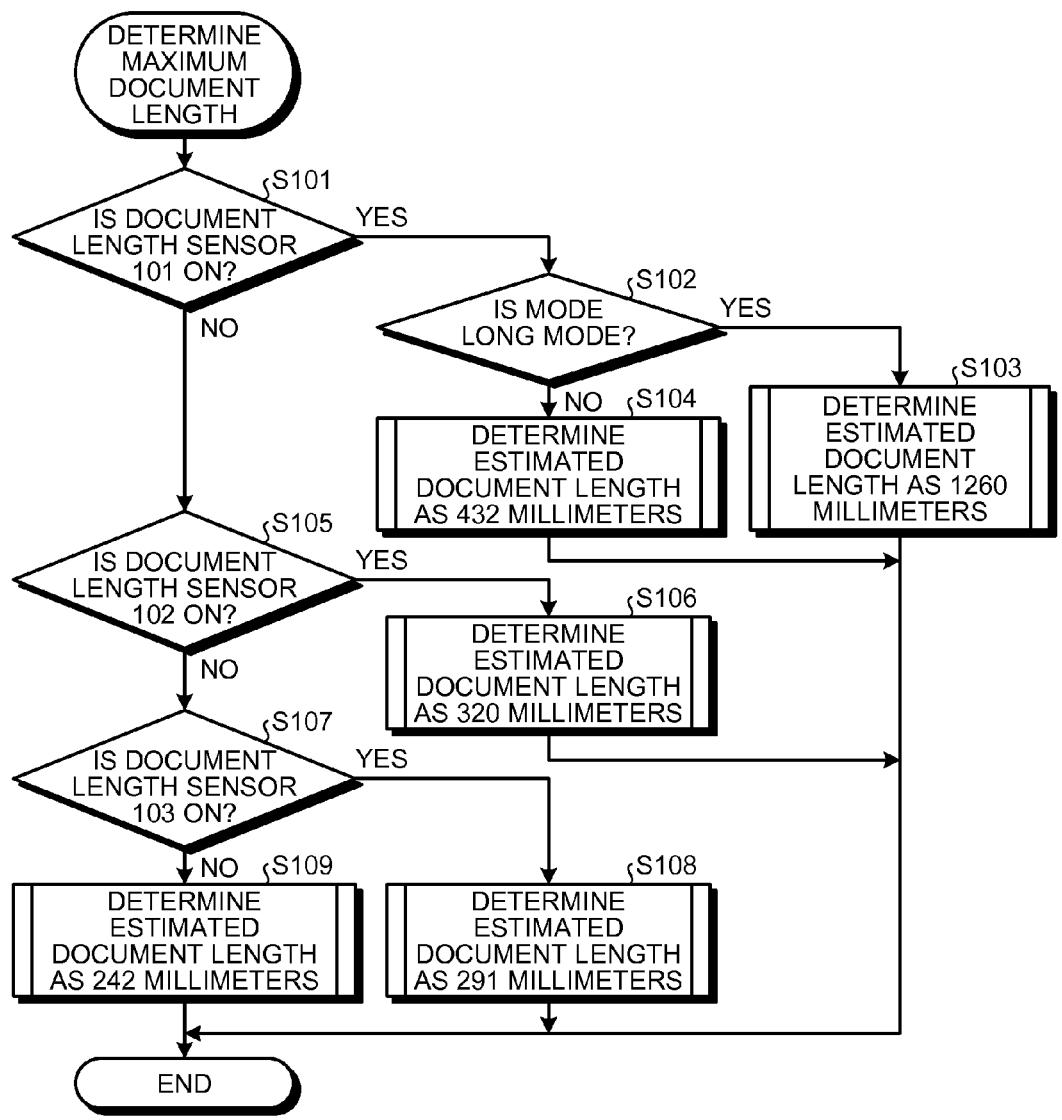
FIG. 4 is a flowchart illustrating a process of estimating a document length.

FIG. 4 is a flowchart illustrating the process of estimating a document length. This process is executed by the CPU 151. When a document length is to be estimated, the CPU 151 checks the detecting state of the first document length sensor 101 (Step S101). If the first document length sensor 101 detects the document sheet (Yes at Step S101), the CPU 151 determines if the operation mode is the long mode (Step S102). If the operation mode is the long mode (Yes at Step S102), the CPU 151 determines 1260 millimeters, which is the maximum document length that can be passed through the automatic document feeding apparatus 100, as the provisional document length (Step S103). If the operation mode is not long document mode (No at Step S102), the CPU 151 determines 432 millimeters, which is the maximum document length of a regular-sized document sheet that can be passed through the automatic document feeding apparatus 100, as the provisional document length (Step S104).

If the first document length sensor 101 does not detect the document sheet (No at Step S101), the CPU 151 checks the detecting state of the second document length sensor 102 (Step S105). If the second document length sensor 102 detects the document sheet (Yes at Step S105), the CPU 151 determines 320 millimeters, which is the maximum document length not detected by the first document length sensor 101, as the provisional document length (Step S106). If the second document length sensor 102 does not detect the document sheet (No at Step S102), the CPU 151 checks the detecting state of the third document length sensor 103 (Step S107). If the third document length sensor 103 detects the document sheet (Yes at Step S107), the CPU 151 determines 291 millimeters, which is the maximum document length not detected by the second document length sensor 102, as the provisional document length (Step S108). If the third document length sensor 103 does not detect the document sheet (No at Step S107), the CPU 151 determines 242 millimeters, which is the maximum document length not detected by the third document length sensor 103, as the provisional document length (Step S109).

Once the determined document length or the provisional document length is determined, the CPU 151 needs to determine if a pre-feeding operation is to be started at what timing by determining if the next document sheet is present (presence of the next document sheet). In the normal mode, the presence of the next document sheet is determined twice including timing at which the trailing end 104a of the document sheet passes through the separation rollers 106, and timing at which the trailing end 104a of the document sheet passes through the abutting sensor 107.

The timing at which the trailing end 104a of the document sheet passes through the separation rollers 106 is estimated based on the determined document length. If the determined document length is not determined, e.g., when currently being fed is a first document sheet, this timing is estimated based on the provisional document length. When the determined document length is used in estimating the timing, the determination of the presence of the next document sheet will be first performed at the timing when the trailing end 104a of the document sheet passes through the separation rollers 106. However, when the provisional document length is used, because a document length needs to be estimated longer than an actual document sheet, the determination of the presence of the next document sheet might be performed first at the timing when the trailing end 104a of the document sheet passes through the abutting sensor 107, before such a determination is performed at the timing when the trailing end 104a of the document sheet passes through the separation rollers 106.

There are two methods for detecting the presence of a document sheet. The first method is to determine if a document sheet is present based on whether the document set feeler 120 is blocking the document set sensor 121. When a document sheet 104 is placed on the document tray 130 and is in contact with the document set claw 116, the document set feeler 120 is lifted. Therefore, the document set sensor 121 is not blocked. Hence, when the document set sensor 121 is not blocked, the CPU 151 determines that a document sheet is present. Because the document set feeler 120 is lowered when no document sheet 104 is placed on the document tray 130, the document set sensor 121 is blocked. Therefore, when the document set sensor 121 is blocked, the CPU 151 determines that a document sheet is not present. However, because the document set feeler 120 is lifted by the trailing end 104a of the document sheet, the presence of the next document sheet cannot be determined with the document set sensor 121 until the trailing end 104a of the document sheet being fed passes through the document set feeler 120.

The second method is to use the trailing end detecting sensor 122. When a document sheet 104 is placed on the document tray 130, the trailing end detecting feeler 119 is pressed down, and the trailing end detecting sensor 122 is blocked. Therefore, the CPU 151 determines that a document is present. By contrast, when no document sheet 104 is placed on the document tray 130, the trailing end detecting feeler 119 is pushed up, so that the trailing end detecting sensor 122 is not blocked. Therefore, the CPU 151 determines that a document is not present. The document set sensor 121 is a transmission photosensor that detects the movable end of the document set feeler 120, and the trailing end detecting sensor 122 is a transmission photosensor that detects the movable end of the trailing end detecting feeler 119. When different types of sensors are used, the detection methods are changed accordingly. However, any type of sensors may be used, as long as a sensor used as the former sensor is capable of detecting the leading end of the document sheet 104 on the document tray 130 and a sensor used as the latter sensor is capable of detecting the trailing end 104a of the document sheet 104 on the document tray 130.

Figure 5:
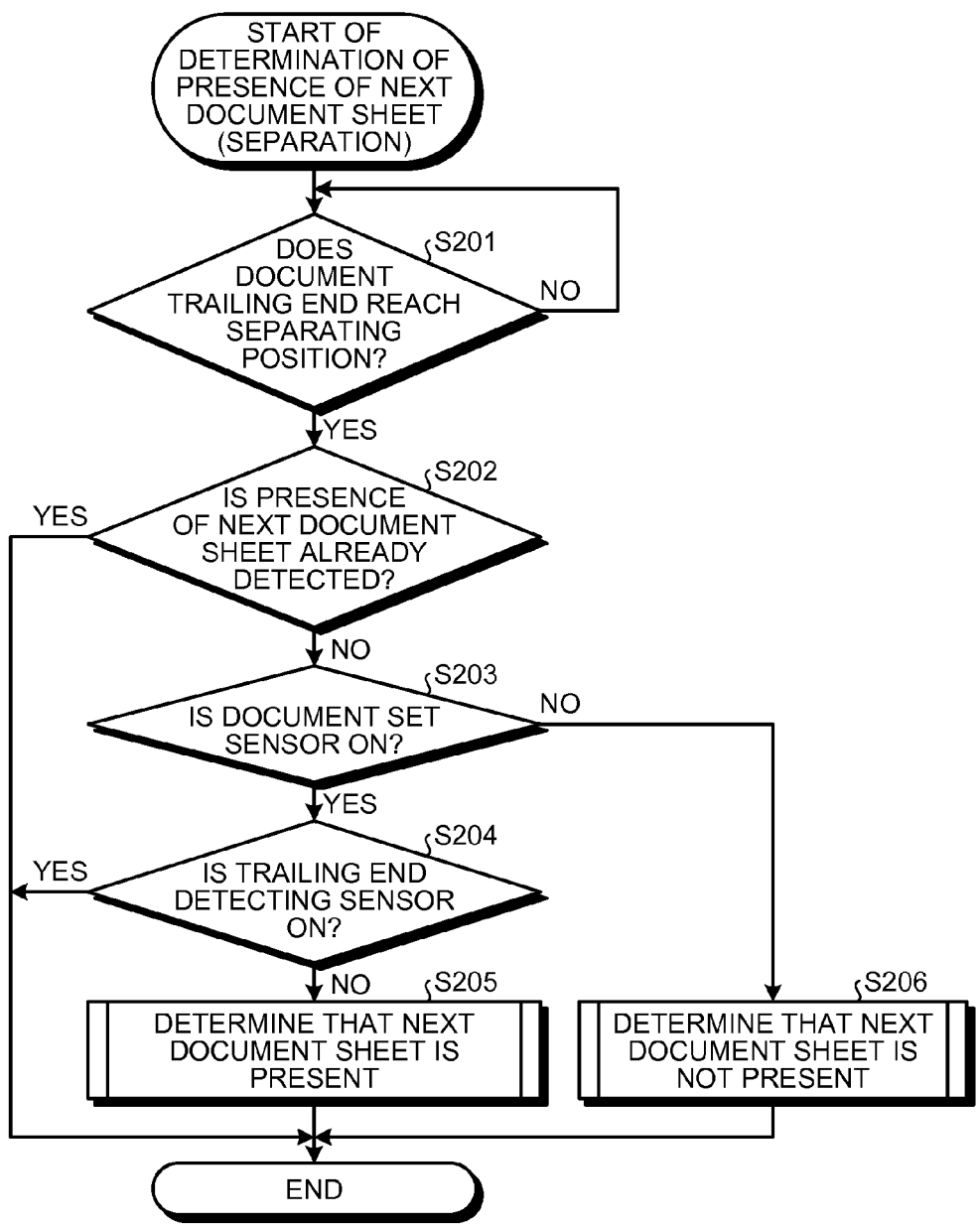
FIG. 5 is a flowchart illustrating a process of determining the presence of the next document sheet based on the timing at which the trailing end of the document sheet passes through the separation rollers.
Figure 6:
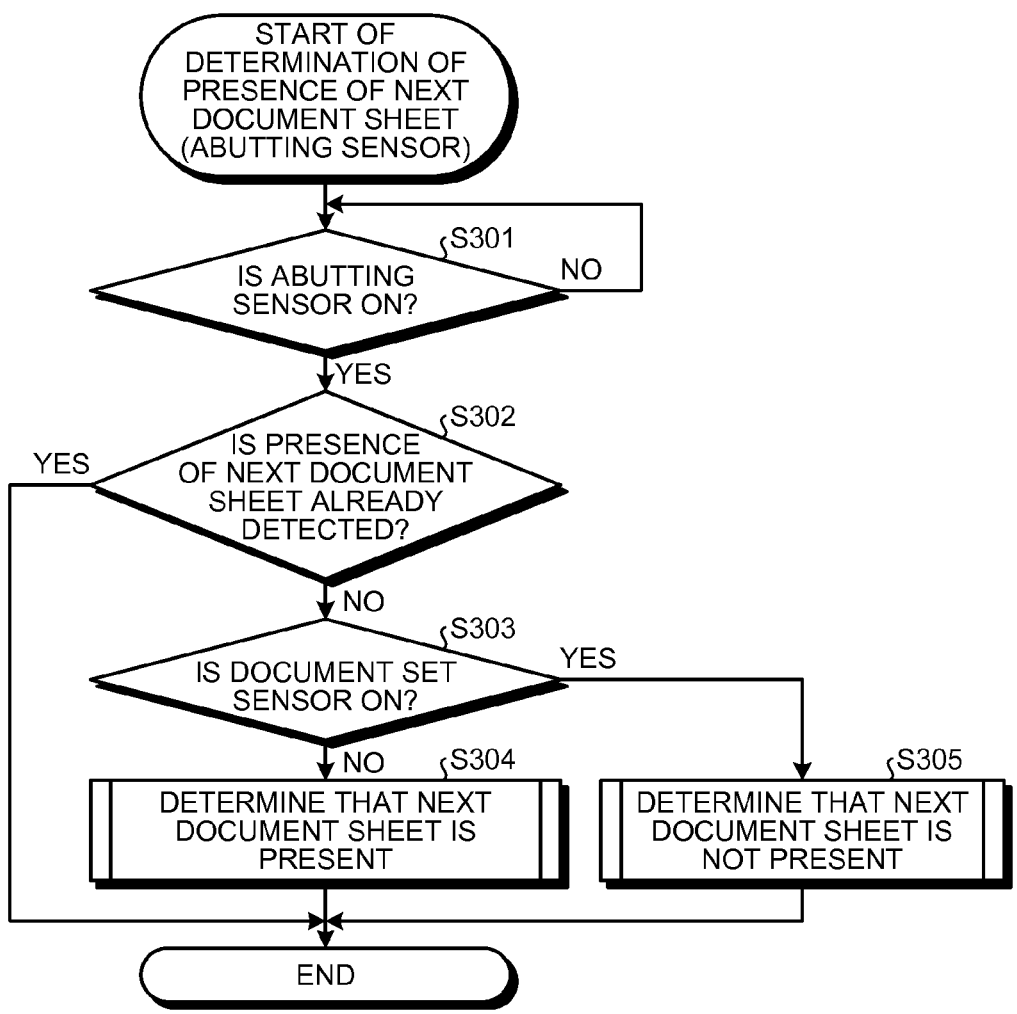
FIG. 6 is a flowchart illustrating a process of determining the presence of the next document sheet based on the timing at which the trailing end of the document sheet passes through the abutting sensor.

Those document detecting methods are used in determining the presence of the next document sheet. FIG. 5 is a flowchart illustrating a process of determining the presence of the next document sheet based on the timing at which the trailing end of the document sheet passes through the separation rollers. FIG. 6 is a flowchart illustrating a process of determining the presence of the next document sheet based on the timing at which the trailing end of the document sheet passes through the abutting sensor. In FIG. 5, the CPU 151 determines if the presence of the next document sheet is already determined (Yes at Step S201) at the timing at which the trailing end 104a of the document sheet passes through the separation rollers 106 (Step S202). If the presence of the next document sheet is not determined yet (No at Step S202), the CPU 151 determines the state of the document set sensor 121 (Step S203). If the document set sensor 121 is not on and/or blocked (No at Step S203), because the document set feeler 120 is returned to the initial position, the CPU 151 determines that a document sheet is not present (Step S206). If the presence of the next document sheet is determined at Step S202, this routine is ended at this point. The process of determining at Step S202 is performed to determine if the process illustrated in FIGS. 5 and 6 are completed. If both of the processes illustrated in FIGS. 5 and 6 are completed, none of these processes needs to be performed. Therefore, this routine is ended.

The reason why this process is performed in the manner described above is as follows. While the actual document trailing end 104a is passing through the separation rollers 106, the document set sensor 121 is not blocked because the document set feeler 120 is lifted. However, when the document length is determined based on a provisional document length, because the document length could be estimated longer than the actual document sheet as mentioned earlier, the document trailing end 104a might have already passed through the separation rollers 106 and the document set feeler 120 might have been lowered, although the control assumes that the document trailing end 104a is currently passing through the separation rollers 106. Even in such a case, the presence of the next document sheet can be determined immediately, because the CPU 151 checks the condition of the document set sensor 121 at the point when the trailing end 104a of the document sheet passes through the separation rollers 106. At Step S201, the timing at which trailing end 104a of the document sheet passes through the separation rollers 106 is estimated based on the determined document length, as mentioned earlier. If the determined document length is not determined yet, e.g., when currently being fed is a first document sheet, this timing is estimated based on the provisional document length.

If the document set sensor 121 is not blocked (Yes at Step S203), the CPU 151 checks the condition of the trailing end detecting sensor 122 (Step S204). If the trailing end detecting sensor 122 is blocked, the CPU 151 determines that the next document sheet is present (Step S205). If the trailing end detecting sensor 122 is not blocked, the CPU 151 does not perform the determination, and waits until the trailing end 104a of the document sheet passes through the abutting sensor 107 before performing another determination of the presence of the next document sheet. The reason why the CPU 151 waits until the trailing end 104a of the document sheet passes through the abutting sensor 107 is that the size of a document sheet 104 detected by the trailing end detecting sensor 122 is limited. When the automatic document feeding apparatus 100 starts feeding a small-sized sheet, e.g., a B6 sized sheet, the trailing end detecting sensor 122 might not detect the trailing end 104a of the document sheet. Therefore, in order to determine the presence of the next document sheet reliably, the CPU 151 waits until the trailing end 104a of the document sheet passes through the abutting sensor 107. In such a case, the system control goes to the flowchart illustrated in FIG. 6.

In FIG. 6, at the point when the trailing end 104a of the document sheet passes through the abutting sensor 107 (Yes at Step S301), the CPU 151 checks if the presence of the next document sheet is already determined, in the same manner as at Step S202 (Step S302). If the presence of the next document sheet is not determined yet (No at Step S302), the CPU 151 checks the condition of the document set sensor 121 (Step S303). If the document set sensor 121 is not blocked (Yes at Step S303), the CPU 151 determines that the next document sheet is present (Step S304). If the document set sensor 121 is blocked (No at Step S303), the CPU 151 determines that the next document sheet is not present (S305).

If the CPU 151 determines that the next document sheet is present through the process of determining the presence of the next document sheet described above (Steps S205, S304), the automatic document feeding apparatus 100 starts feeding the next document sheet. In this manner, the automatic document feeding apparatus 100 can start feeding the next document sheet as soon as possible without making a determination error of the presence of the next document sheet. As a result, sheets can be passed highly productively. Furthermore, the presence of the next document sheet can be determined by performing one process that is the process illustrated in FIG. 5, or by performing two processes that are processes illustrated in FIGS. 5 and 6.

In the manner described above, according to the embodiment, the following advantageous effects can be achieved:

1) Because the presence of the next document sheet is determined based on the determined document length or the provisional document length at the point when the trailing end reaches a particular position, such a determination can be made through two processes at most and one process at least.

2) Although the timing at which the first determination is made is later than that performed in the conventional technology, such a determination is made at a timing at which the productivity is not affected at all.

3) Because the document set sensor 121, the trailing end detecting sensor 122, and the abutting sensor 107 are caused to detect the trailing end of the document sheet 104 at the timing at which the document sheet 104 enters the paper feeding conveying path 131 (timing at Step S201), detection is not affected by a curl.

4) Because the presence of the next document sheet is determined at the timing at which the abutting sensor 107 is turned ON even when the size of the document sheet is small, the presence of the next document sheet can be determined at an early stage, so that the productivity is not reduced.

5) Although the exact document length is not known for a first sheet, because the trailing end 104a of the document sheet can be estimated using the document length estimated using sensors for detecting the document length provided on the document tray, the trailing end 104a of the document sheet can be detected at an early stage.

6) Once the presence of the next document sheet is determined, the subsequent process of determining the presence of the next document sheet can be considered unnecessary and omitted. Therefore, processing time can be reduced.

In the accompanying claims, a document sheet corresponds to the reference numeral 104. A document setting unit corresponds to the document tray 130. A separating feeding unit corresponds to the separation rollers 106. A scanning unit corresponds to the exposure glass 111. An automatic document feeding apparatus corresponds to the reference numeral 100. The trailing end of a document sheet corresponds to the reference numeral 104a. A trailing end detecting unit corresponds to the trailing end detecting sensor 122. A document set detecting unit corresponds to the document set sensor 121. A conveying path document detecting unit corresponds to the abutting sensor 107. A determining unit corresponds to the CPU 151. An image scanning apparatus corresponds to the reference numeral 200. An image forming apparatus corresponds to the reference numeral 300. An image forming system corresponds to the copying machine 1 (a system including the image scanning apparatus 200 including the automatic document feeding apparatus 100 and the image forming apparatus 300).

According to the present invention, the presence of the next document sheet can be determined efficiently even when the size of the document sheet is small, without being affected by how a document sheet is curled, document slipping, or the like.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An automatic document feeding apparatus comprising:
    a document setting unit on which a plurality of document sheets to be scanned are placed; and
    a separating feeding unit configured to separate and feed a document sheet one by one from the document sheets placed on the document setting unit, wherein
    the automatic document feeding apparatus is configured to convey the document sheet thus separated to a scanning unit and cause the document sheet to be scanned by the scanning unit while conveying the document sheet, and
    the automatic document feeding apparatus further comprises,
        a document presence detecting unit configured to detect whether a document sheet is present on the document setting unit;
        a document set detecting unit configured to detect whether a leading end of a document sheet is present on a set position on the document setting unit;
        a conveying path document detecting unit configured to detect a document sheet being conveyed to the scanning unit on a conveying path; and
        a determining unit configured to determine a presence of a next document sheet based on detecting states of the detecting units,
        the determining unit is configured to check the detecting state of the document set detecting unit at a point when a trailing end of the document sheet is assumed to pass through a separating position at which the document sheet is separated by the separating feeding unit, using a document length determined based on a detecting output of the conveying path document detecting unit,
        when the document set detecting unit does not detect a document sheet, the determining unit is configured to determine that the next document sheet is not present, and when the document set detecting unit does not detect a document sheet, the determining unit is further configured to check the detecting state of the document presence detecting unit,
        when the document presence detecting unit detects that a document sheet is present, the determining unit determines that the next document sheet is present, but when the document presence detecting unit detects that a document sheet is not present, the determining unit is configured to wait until the trailing end of the document sheet passes through the separating position, and at that point, when the document set detecting unit detects a document sheet, the determining unit is configured to determine that the next document sheet is present, but when the document set detecting unit does not detect a document sheet, the determining unit is configured to determine that the next document sheet is not present.

2. The automatic document feeding apparatus according to claim 1, wherein, when a document length of a first document sheet or a document length of the document sheet is not determined, the determining unit is configured to determine the presence of the next document sheet at a point at which a document length estimated by a document length detecting unit provided on the document setting unit passes through the separating position.

3. The automatic document feeding apparatus according to claim 2, wherein
    the document length detecting unit is provided in plurality along a conveying direction of a document sheet, and
    the determining unit is configured to estimate a document length based on detecting states of the document length detecting units.

4. The automatic document feeding apparatus according to claim 1, wherein, when the presence of the next document sheet is already determined at a point when the trailing end of the document sheet passes through the separating position or a position of the conveying path document detecting unit, the determining unit does not determine whether the next document sheet is present.

5. An image scanning apparatus comprising the automatic document feeding apparatus according to claim 1.

6. An image forming system comprising the automatic document feeding apparatus according to claim 1.

7. An automatic document feeding apparatus comprising:
    a document presence detecting unit configured to detect whether a document sheet is present to be scanned;
    a document set detecting unit configured to detect whether a leading end of a document sheet is present;
    a conveying path document detecting unit configured to detect a document sheet being conveyed to be scanned on a conveying path; and
    a determining unit configured to determine a presence of a next document sheet based on detecting states of the detecting units,
    the determining unit is configured to check the detecting state of the document set detecting unit at a point when a trailing end of the document sheet is assumed to pass through a separating position at which the document sheet is separated, using a document length determined based on a detecting output of the conveying path document detecting unit,
    when the document set detecting unit does not detect a document sheet, the determining unit is configured to determine that the next document sheet is not present, and when the document set detecting unit does not detect a document sheet, the determining unit is further configured to check the detecting state of the document presence detecting unit,
    when the document presence detecting unit detects that a document sheet is present, the determining unit is configured to determine that the next document sheet is present, but when the document presence detecting unit detects that a document sheet is not present, the determining unit is configured to wait until the trailing end of the document sheet passes through the separating position, and when the document set detecting unit detects a document sheet, the determining unit is configured to determine that the next document sheet is present, but when the document set detecting unit does not detect a document sheet, the determining unit is configured to determine that the next document sheet is not present.

8. The automatic document feeding apparatus according to claim 7, wherein, when a document length of a first document sheet or a document length of the document sheet is not determined, the determining unit is configured to determine the presence of the next document sheet at a point at which a document length estimated by a document length detecting unit passes through the separating position.

9. The automatic document feeding apparatus according to claim 8, wherein
the document length detecting unit is provided in plurality along a conveying direction of a document sheet, and
the determining unit estimates a document length based on detecting states of the document length detecting units.

10. The automatic document feeding apparatus according to claim 7, wherein, when the presence of the next document sheet is already determined at a point when the trailing end of the document sheet passes through the separating position or a position of the conveying path document detecting unit, the determining unit does not determine whether the next document sheet is present.

11. An image scanning apparatus comprising the automatic document feeding apparatus according to claim 7.

12. An image forming system comprising the automatic document feeding apparatus according to claim 7.

13. A method for detecting a presence of a next document sheet being feed through an automatic document feeding apparatus, the method comprising:
detecting, by a document presence detecting unit, whether a document sheet is present on a document setting unit;
detecting, by a document set detecting unit, whether a leading end of a document sheet is present on a set position on the document setting unit;
detecting, by a conveying path document detecting unit, a document sheet being conveyed to a scanning unit on a conveying path;
determining, by a determining unit, the presence of the next document sheet based on detecting states of the detecting units; and
determining, by the determining unit, the detecting state of the document set detecting unit at a point when a trailing end of the document sheet is assumed to pass through a separating position at which the document sheet is separated by the separating feeding unit, using a document length determined based on a detecting output of the conveying path document detecting unit, and
when the document set detecting unit does not detect a document sheet, the determining unit determines that the next document sheet is not present, and when the document set detecting unit does not detect a document sheet, the determining unit further checks the detecting state of the document presence detecting unit,
when the document presence detecting unit detects that a document sheet is present, the determining unit determines that the next document sheet is present, but when the document presence detecting unit detects that a document sheet is not present, the determining unit waits until the trailing end of the document sheet passes through the separating position, and at that point, when the document set detecting unit detects a document sheet, the determining unit determines that the next document sheet is present, but when the document set detecting unit does not detect a document sheet, the determining unit determines that the next document sheet is not present.

* * * * *